United States Patent [19]

Hennes et al.

[11] 4,034,692
[45] July 12, 1977

[54] INSTALLATION FOR MAKING CANS OF METAL

[75] Inventors: Heinrich Hennes; Walter Sommer, both of Essen, Germany

[73] Assignee: Fried. Krupp Gesellschaft mit beschrankter Haftung, Essen, Germany

[21] Appl. No.: 611,799

[22] Filed: Sept. 9, 1975

Related U.S. Application Data

[63] Continuation of Ser. No. 443,851, Feb. 19, 1974, abandoned.

[30] Foreign Application Priority Data

Feb. 19, 1973   Germany ........................ 2308132

[51] Int. Cl.² ......................................... B21D 51/26
[52] U.S. Cl. ............................. 113/7 R; 113/120 A
[58] Field of Search .......... 113/1 R, 1 P, 1 M, 1 E, 113/1 G, 7 R, 7 A, 120 R, 120 A, 120 H, 120 AA, 120 M; 134/152, 170, 171, 199; 118/254, 317, 318, 408

[56] References Cited

U.S. PATENT DOCUMENTS

| 2,455,785 | 12/1948 | Larson | 113/7 R |
|---|---|---|---|
| 2,650,178 | 8/1953 | Martin et al. | 113/7 R |
| 2,846,972 | 8/1958 | Bofinger | 113/7 R |
| 2,859,729 | 11/1958 | Socke | 113/7 R |
| 3,053,209 | 9/1962 | Smith et al. | 113/7 R |
| 3,063,860 | 11/1962 | Gemmer | 118/408 X |
| 3,232,260 | 2/1966 | Siemonsen | 113/7 R |
| 3,353,515 | 11/1967 | Stolle et al. | 134/170 |
| 3,424,118 | 1/1969 | Stolle et al. | 113/1 R |
| 3,430,410 | 3/1969 | Heisler | 113/1 R |
| 3,811,393 | 5/1974 | Close | 113/120 R |
| 3,815,535 | 6/1974 | Becker et al. | 113/120 A |

Primary Examiner—E. M. Combs
Attorney, Agent, or Firm—Walter Becker

[57] ABSTRACT

An installation for making and treating cans of metal, in which the individual working operations such as deep-drawing, ironing, trimming of the can rim and the forming of the can bottom, the washing, drying, inside coating and decorating the cans as well as the necking of the can rim and the flanging are carried out in individual working stations which are interconnected by a conveying device that feeds the raw cans in a predetermined rhythm and arrangement and in a predetermined spaced relationship to each other to the individual working stations.

3 Claims, 17 Drawing Figures

FIG. 1
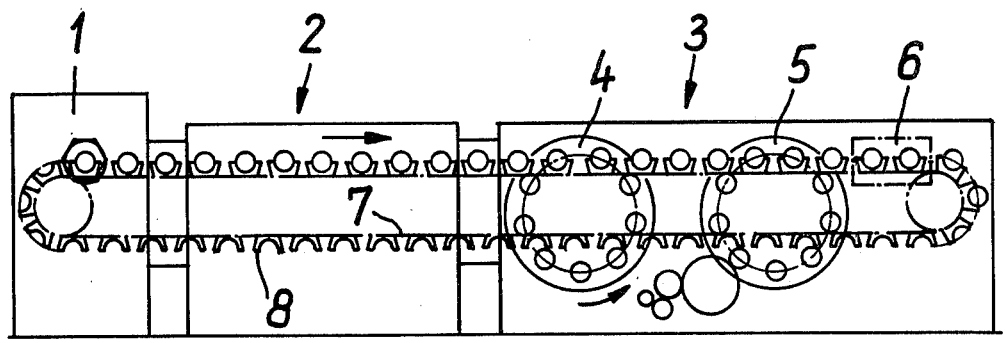
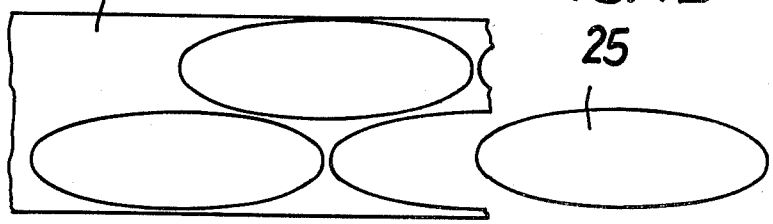 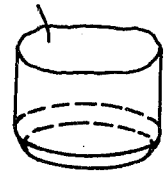
FIG. 4a  FIG. 4b  FIG. 4c
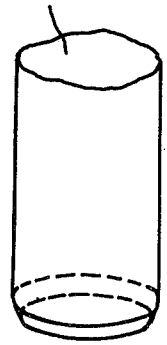 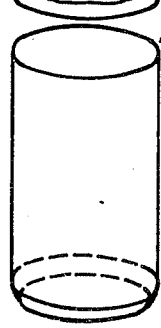
FIG. 4g
 
FIG. 4d  FIG. 4e  FIG. 4f  FIG. 4h

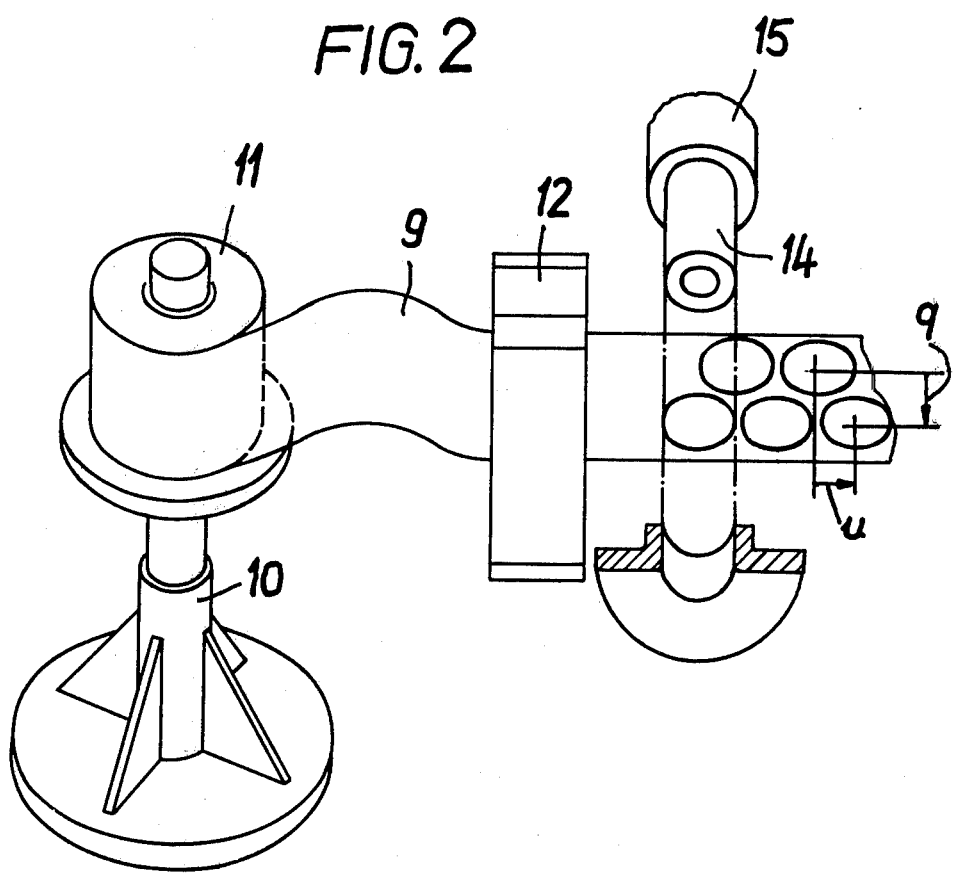

INSTALLATION FOR MAKING CANS OF METAL

This is a continuation of application Ser. No. 443,851, filed Feb. 19, 1974, now abandoned.

The present invention relates to a plant for making cans of metal in which the cans are produced, washed, dried, inside coated and decorated.

Installations for making and processing cans of metal are known in which the ironing of the can bodies from cups, the trimming of the can rim, the forming of the can bottom, the washing and drying, inside coating and decorating, and finally also the making of the can rim and the flanging is carried out in successive operations on different machines. The individual machines are interconnected by relatively expensive transporting devices. Also the production output of the individual machines is not always the same so that it becomes necessary to branch out the production flow or to rejoin it.

Heretofore known installations of the type involved have above all the drawback that they require considerable space because not only a relatively great number of individual machines is required but above all the transporting devices also require a considerable spacing between the individual machines. The branching-off and rejoining of production flows requires a complicated circuit and control of the installation. Furthermore, also the transporting devices used in connection with the heretofore known installations of the type involved bring about the danger that the cans are damaged while passing through the relatively long and frequently direction-changing path.

It is, therefore, an object of the present invention to provide an installation for the manufacture of cans which will require only a relatively small space, is simple in construction and, in which the cans are carefully handled while passing through the installation.

These and other objects and advantages of the invention will appear more clearly from the following specification in connection with the accompanying drawings, in which:

FIG. 1 is a diagrammatic side view of the installation according to the invention for making cans.

FIG. 2 shows a device for winding off a sheet metal band.

FIG. 4a–4h illustrate the various phases of producing a can as it is manufactured by the installation of FIG. 1.

Figure 6:
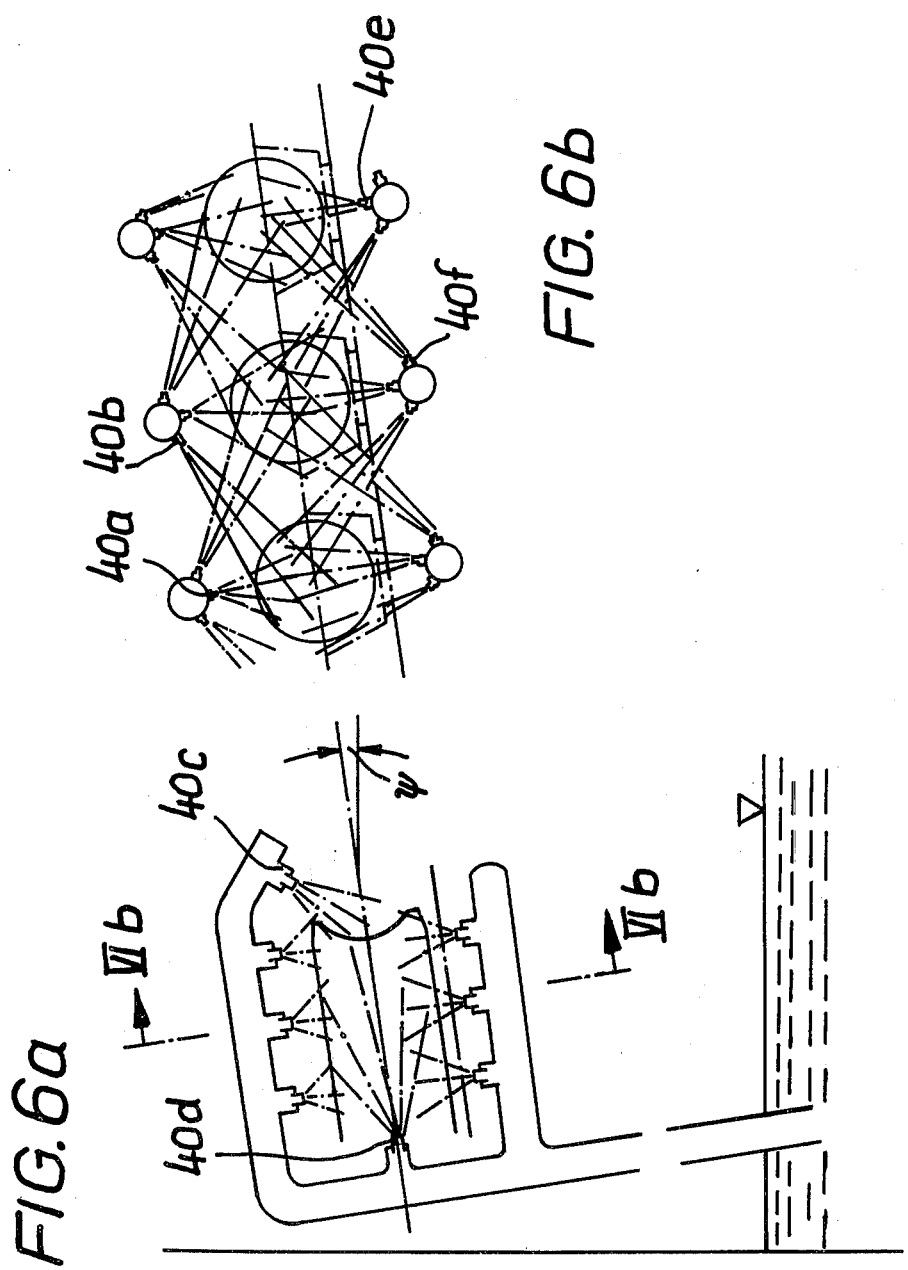

FIG. 6a and 6b respectively illustrate a side view of the spraying and blow nozzles of the washing installation.

Figure 7:
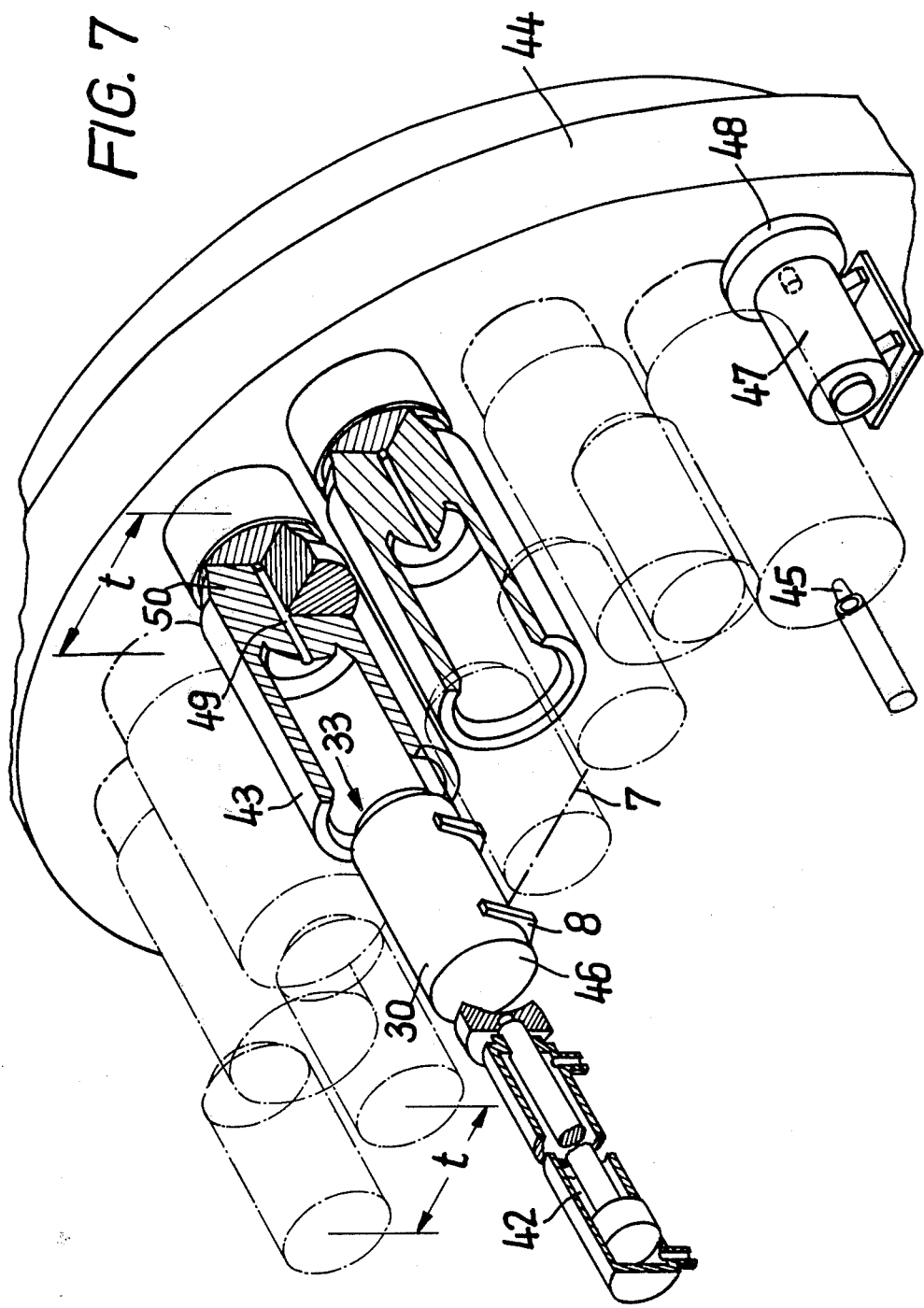

FIG. 7 is a partial view of the station for inside coating the cans being produced in the installation of FIG. 1.

Figure 8:
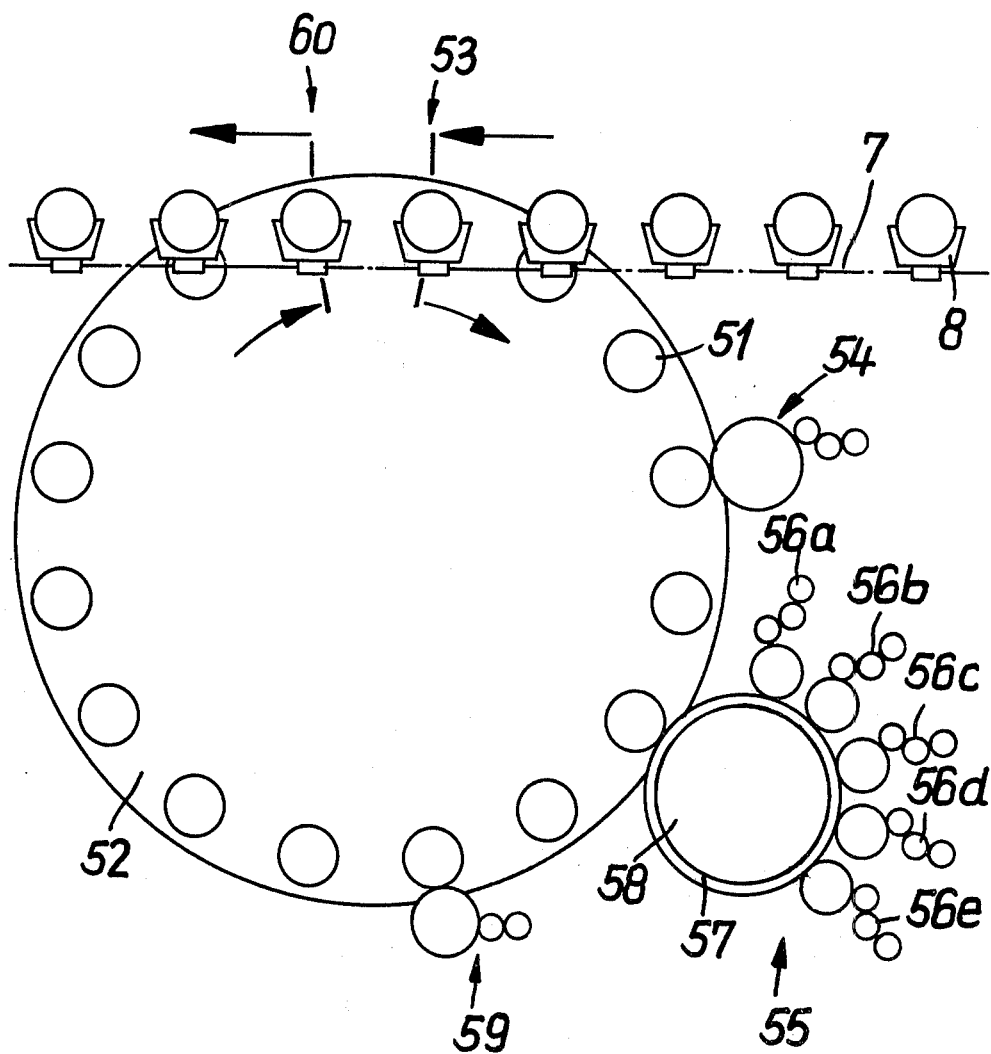

FIG. 8 shows the station for decorating the outside of the cans being made in FIG. 1.

Figure 9:
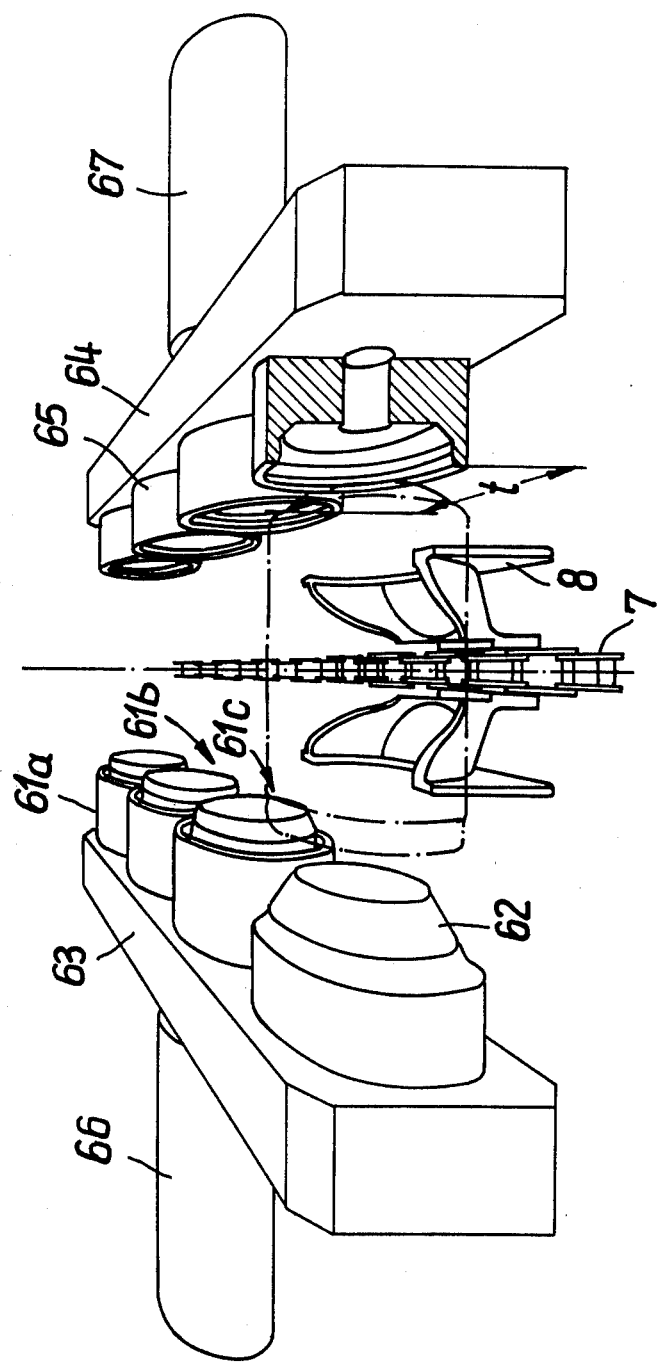

FIG. 9 illustrates a prospective view of the station for making and flanging the can rims.

The installation for making and processing cans of metal according to the present invention is characterized primarily in that the individual working stations which are combined to a unit are interconnected by conveying means which feeds the ironed can bodies at a predetermined distance in predetermined cycles to the individual working stations. It is particularly advantageous in this connection to employ as conveying means an endless chain to which equally spaced there are connected receiving members into which the can bodies can be inserted.

The ironing station of the installation according to the invention preferably comprises a drawing mandrel which in a single working stroke irons the raw can body from a cup and simultaneously trims the same and transforms its bottom. In the said ironing station there may simultaneously in one working stroke a disc be punched out from a plate of sheet metal or a sheet metal band, and the said disc may be deep drawn to a cup.

According to a particularly advantageous embodiment of the invention, the ironing station is preceded by a feeding device which moves a sheet metal band with each working cycle forwardly and alternately into one of two opposite transverse directions in such a way that it will be possible by means of one punching tool to punch out two rows of discs from said band.

In some instances it may be expedient in individual working stations to take the can bodies out of the receiving means connected to the endless conveyor chain, and to convey said can bodies for further processing to separate holding devices from which they are after completion of the respective operation again transmitted to the receiving means on the conveyor chain.

Referring now to the drawings in detail, the installation shown in FIG. 1 comprises two main sections namely the ironing press 1, the washing station 2, and a combination machine 3, which includes a station 4 for coating the inside of a can, a printing station 5 for decorating the cans, and a station 6 for necking and flanging the cans. An endless chain 7 passes continuously through all three main sections 1, 2 and 3. The chain 7 receives the cans after they are manufactured and during processing of the cans passes the same over the shortest path from one working station to another working station. To this end, the chain 7 is equipped with receiving elements 8 by which the can bodies are received for their transport. In the most simple manner, the press 1 is vertically charged with a metal band 9 which is withdrawn from a metal band coil 11 placed upon an unwind 10 (FIG. 2) and is fed to the ironing press 1 by means of a feeding device 12. In order economically to handle the transforming of cans directly by one tool, the punching out of the discs is provided in two rows. To this end, the feeding device 12 has with each cycle to advance the band 9 by a stroke u and has to move the band 9 alternately upwardly and downwardly (FIG. 2) by the distance $q$.

Figure 3:
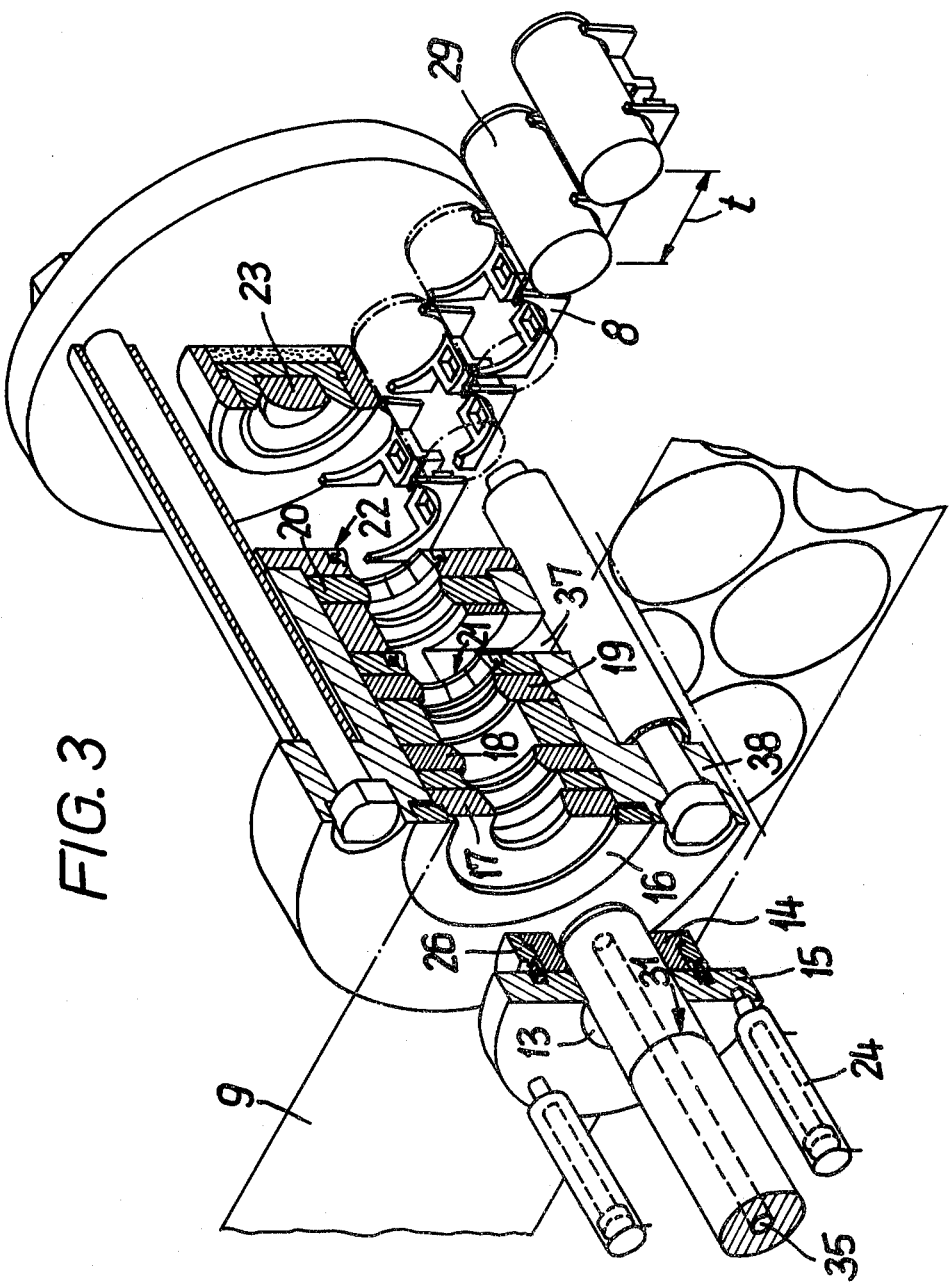
FIG. 3 is an isometric longitudinal section through the ironing station.

The tool of the ironing press 1 consists primarily of two movable parts, namely the drawing mandrel 13 (FIG. 3) and the cutting punch 14 with the cutting punch holder 15 and the stationary tool part which comprises a cutting ring 16, a drawing ring 17, at least one ironing ring 20, two stripper rings 21 and 22, and a bottom forming tool 23.

The cutting punch holder 15 is by a plurality of hydraulic cylinders 24 pressed against the stationary part of the tool. The cutting punch 14 comes down onto the sheet metal piece 9 and in cooperation with the cutting ring 16 punches out therefrom a disc 25. A resilient sheet metal holder 26 sees to it that the sheet metal plate snugly fits the cutting ring 16. After the disc 25 has been punched out, the punch 14 takes over the function of a down-holder inasmuch as it presses said disc against the drawing ring 17. Subsequently, the drawing mandrel 13 is moved which may be driven by a non-illustrated hydraulic cylinder. This drawing mandrel 13 forces the disc 25 through the drawing ring 17 and thus forms a pan 28 (FIG. 4) or cup. In the subsequent ironing rings 18, 19 and 20, the body wall of the can is step-wise thinned whereby the height of the can is increased. The thus formed can body 29 is during a further processing step trimmed uniformly at its rim to a predetermined length and thus will be shaped to the form 30 (FIG. 4). By means of a thickened portion 31 of the drawing mandrel 13, which substantially corresponds to the inner diameter of the last ironing ring 20, the material exceeding the predetermined length is squeezed off in the form of a non-uniform ring.

At the end of its stroke, the drawing mandrel 13 presses the can against a spring supported bottom forming tool 23 while the bottom 33 obtains a predetermined inwardly directed shape.

When withdrawing the drawing mandrel 13, the open rim 34 of the can is grasped by the stripping-off ring 22, and the can is retained. In this case it is advantageous to subject the bottom of the can from the inside of slight pressure in order to counteract the tendency of a vacuum forming between the drawing mandrel and the can.

The drawing mandrel 13 is to this end provided with a bore through which compressed air may be conveyed from the outside.

After the mandrel has withdrawn from the plane of the stripping-off ring 22, the can body 29 drops upon a chain receiving means 8. When the drawing mandrel has also withdrawn from the plane of the stripper ring 21, the waste ring 32 has been stripped off the drawing mandrel 13 and may drop through an opening 37 of the housing 38 in downward direction. During the last portion of the return stroke of the drawing mandrel 13, the chain 7 is advanced by a pitch $t$. As a result thereof a free chain receiving means will be available for the next working stroke.

Figure 5:
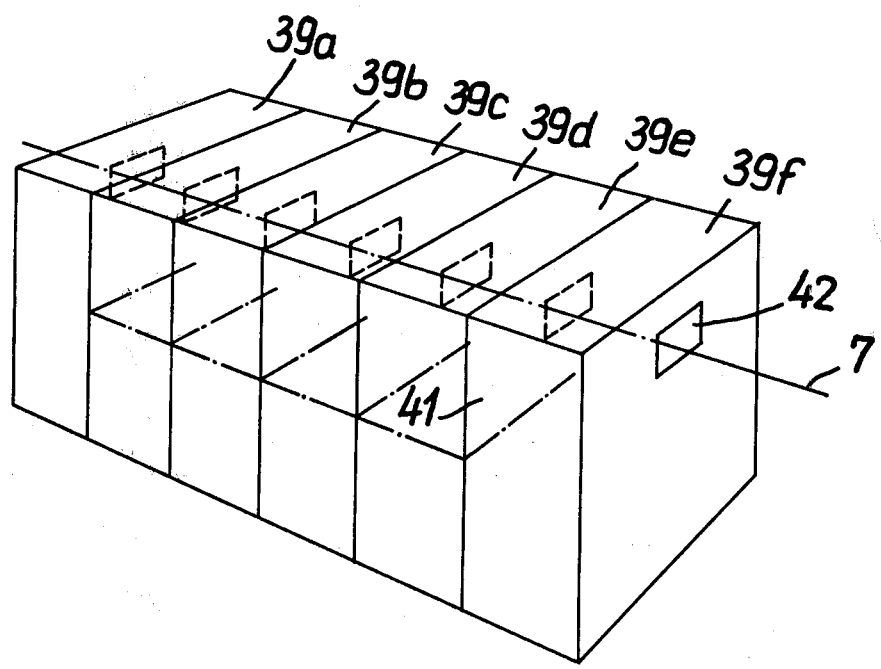
FIG. 5 shows the washing station of the arrangement of FIG. 1 in a diagrammatic manner.

The can bodies are by the chain moved from the ironing press 1 into the washing station 2 which is subdivided into a number of ranges. With the washing station illustrated in FIG. 5, there are provided for instance six ranges 39a to 39f. In the first range, a considerable part of the lubricant is blown off by means of air. In the second range, the cans are pre-rinsed with water. In the third range, a washing is effected by means of a washing ingredient, in the fourth range a rinsing takes place with water, in the fifth range the cans are post-rinsed with desalinated water, and in the sixth range a pre-drying is effected by means of blown air. The additional drying is effected in the coating station which follows the washing station. In each range of the washing station there are arranged nozzles 40 which spray the cans from all sides and blow thereupon for instance vertically from above, by nozzles 40a, at an incline from above with nozzles 40b, from the rear with nozzles 40c, from the inside with nozzles 40d, from below with nozzles 40e and at an incline from below with nozzles 40f. The cans remain while passing through the washing station 2 upon the chain-connected receiving means 8. The walls 41 of the washing station 2 which separate the individual ranges are provided with openings 42 through which the chain 7 with the cans 30 may pass. In order to make sure that water and washing liquid can better flow out of the cans, it is advantageous to arrange the chain 7 in a transverse direction by a certain angle for instance the angle 8° (FIG. 6a).

In the coating station 4, the cans 30 are by means of a pressure cylinder 42 pressed out of the chain receiving means 8 into a heatable hollow cylindrical receiving means 43 (FIG. 7) of which a plurality is uniformly distributed over the flange of a stepwise advanced wheel 44. Each time after a can has been inserted, the wheel 44 is advanced by a pitch t. After one or more pitches there is provided a spray nozzle 45 which sprays a protective varnish or enamel over the inner surface of the can 46. The remaining water film which has its origin in the washing process has previously been completely evaporated by the heating effect of the receiving means 43. The part of the water steam which forms on the inside of the can will escape directly into the atmosphere. That portion which forms on the outside of the can escapes from the gap which between can and inner wall of the heating body is predetermined already for reasons of tolerances, and also escapes from the bores 49.

For repeatedly spraying the inside of cans, an additional nozzle may be provided. It is also advantageous to rotate the receiving means 43 with the can rim, during the spraying operation so that the protective varnish will be uniformly distributed over the inner surface of the can. To this end, there may, for instance, an auxiliary motor 47 be provided with a friction wheel 48. However, also a transmission belt may be employed. When the respective receiving means 43 approximately after one revolution of the wheel 44 is again in alignment with a chain receiving means 8, the can is by means of compressed air passing through a bore 49 to the receiving means 43 and acting upon the bottom 33 of the can, pressed upon the chain-receiving means 8. In the meantime, the sprayed in protictive varnish has dried in view of the heating of the receiving means. The can is subsequently by the chain receiving means 8 conveyed to the printing station 5.

In the printing station 5 the cans are again by means of a pressure cylinder pushed from the chain receiving means, and more specifically are pushed upon mandrels 51 which are adapted to be heated and of which a plurality is uniformly distributed and rotatably arranged over the circumference of a wheels 52 which is adapted to be rotated by cycles (FIG. 8).

In the direction of rotation of the wheel 52, behind the receiving station 53 at which the cans are pushed from the chain receiving means onto the mandrels, there is provided a roller combination 54 adapted to transfer a base varnish or enamel onto the outer wall of the can. This is followed by a multi-dye printing mechanism 55 in which the individual roller arrangements 56a–56e transfer their color components to a rubber cloth 57 which is tightened onto a collector roller 58 and which transmits the dyes to the outer wall of the cans. By means of a further roller combination 59, which is arranged directly behind the collecting roller 58, a transparent protective varnish or enamel is applied to the outer wall of the can above said printing dyes. At the transfer station 60, the cans are again transferred to the chain receiving means 8. This is effected again by means of compressed air which acts upon the can bottom from the inside thereof. When the cans have reached the transfer station 60, the base varnish, printing dyes and protective varnish have dried in view of the heat conveyed by the heated mandrels 51.

Directly behind the printing station 5, there are provided tools 6 for necking the open cam rim and for flanging the cans.

The two tools operate according to the upsetting method according to which the necking operation is preferably effected in three stages. The neck diameter of the can $d_N$ is reduced stepwise.

The three necking tools 61a, 61b and 61c and the flanging tool 62 are preferably connected to a common transverse beam 63 as shown in FIG. 9. At the oppositely located side of chain 7, bottom receiving means 65 are connected to a second transverse beam 65. The two transverse beams 63 and 64 are by cycles moved toward each other by a common control pulse from pressure cylinders 66 and 67, respectively, while the cans are located in chain receiving means 8 and are by means of chain 7 after each working operation moved forwardly by a pitch t. The cans are in this way necked and flanged stepwise, while the distance between the tools 61a, 61b and 61c respectively amounts to the pitch t. The tools 61a, 61b and 61c, 62 and 63 are within the region of the central axis provided with bores through which compressed air can be passed in order to blow the cans out of the tools. In this way it will be assured that the cans leave the tools in a proper manner. At the end of the station 6 for necking and flanging the cans, the necked and flanged cans 68 are placed upright for instance by an upender twister. In this way they will be brought into the proper position for being packaged for instance on a paletizer.

It is, of course, to be understood that the present invention is, by no means, limited to the specific showing in the drawings, but also comprises any modifications within the scope of the appended claims.

We claim:

1. An installation for making and treating cans of metal, which includes in combination: a plurality of stations for operating on cans connected by only one chain conveyor interconnecting all stations and having can holding means, said chain conveyor being angularly inclined in a transverse direction, means for intermittentley feeding a strip of sheet metal step by step to a first station having means for cutting disk blanks from said strip and including means for drawing said blanks to form cans, closed at one end and open at the other end and means for depositing said cans on said can holding means, a second station having means for performing successive washing steps on said cans, said cans being so arranged that cans on the angularly inclined chain have their open ends located at a lower level than for closed ends thereof, a third station having external heating means for receiving said cans for heating the outer sides of said cans and means for inside coating of the cans, and means to transfer said cans from said holding means to said external heating means and back to said holding means, a fourth station for receiving said cans on internal heating means for heating said cans internally and means for coating and printing the outer surface of said cans, and means to transfer said cans from said holding means to said internal heating means and back to said holding means, and a fifth station having means for successively necking, flanging and finishing the completed cans.

2. An installation in combination according to claim 1 wherein said can holding means includes can receiving and support means which are embodied to permit passage of water and air flow over substantially the entire surface area of said cans from a direction below and at an upwardly inclined angle relative to said cans.

3. An installation for making cans including a station having means for intermittently feeding a strip to a first station for cutting disk blanks from said strip, said feeding means including means for moving said strip longitudinally step by step with each step equal to a distance less than the diameter of the blank formed at said station said means also moving said strip alternately in opposite directions transversely of said strip, so as to reduce waste of material of the strip, and means for forming can bodies closed at one end and open at the other end at said station, a conveyor for transferring said can bodies to an internal coating station including a rotatable wheel which is indexed in step with movement of said conveyor, a plurality of heating means on said wheel and formed to contact and heat the external surface of said can bodies, means for moving said can bodies transversely from said conveyor into said heating means in contact with the external surface of said can bodies, coating means for coating the internal surface of the can bodies while heated by said heating means, means for moving said can bodies off said heating means and onto said conveyor for transferring said can bodies to, an external coating station including a plurality of internal heating mandrels and means for moving said can bodies transversely from said conveyor onto said internal heating madrels, and roller means for coating and printing the exterior surfaces of said can bodies, said internal heating mandrels being mounted on a wheel which is indexed in step with movement of said conveyor, and means for moving said can bodies off said mandrels and onto said conveyor for transferring said can bodies to a neck-forming station including a plurality of tools opposite successive indexed positions on one side of said conveyor and opposed can holding means on the opposite side of said conveyor, for necking and flanging said cans.

* * * * *